United States Patent

[11] 3,577,098

[72] Inventor Harvey V. Winston
Los Angeles, Calif.
[21] Appl. No. 741,682
[22] Filed July 1, 1968
[45] Patented May 4, 1971
[73] Assignee Hughes Aircraft Company
Culver City, Calif.

[54] THERMALLY COMPENSATED LASER
5 Claims, 5 Drawing Figs.
[52] U.S. Cl. .................................................. 331/94.5,
350/160, 350/175
[51] Int. Cl. .................................................. H01s 3/02
[50] Field of Search ........................................... 331/94.5;
350/160, 175 (GNL)

[56] References Cited
OTHER REFERENCES

Akhmanov, et al., Thermal Self-Actions of Laser Beams, IEEE J. Quant. Elect., Vol. QE-4, No. 10 (Oct. 1968) pp. 568-−575

Primary Examiner—Ronald L. Wibert
Assistant Examiner—William L. Sikes
Attorneys—James K. Haskell and John Holtrichter, Jr.

ABSTRACT: The invention is a laser in which an undesired thermal lensing effect of the active laser material is compensated by an addition of a material having a thermal lensing characteristic opposite that characteristic of the laser material. The active laser element and the compensating element are disposed within a regenerative cavity in a regenerative path defined between two end reflectors. As the active laser element is excited by pump energy, a thermal gradient in the laser material results from the excitation and a similar thermal gradient also results in the compensating material to negate the aforementioned thermal lensing effect.

Harvey V. Winston,
INVENTOR.
BY.

*J. Hollister J.*
ATTORNEY.

THERMALLY COMPENSATED LASER

These thermal lensing effects are caused by the formation of a radius dependent function of temperature, and as the index of refraction for many materials used as active laser elements is a function of temperature, the overall effect is the formation of a convex or concave lens.

Prior art techniques designed to overcome this problem consisted of the grinding of a concave or convex lens on an end surface of the laser element to compensate for the thermal lensing. It should be quite evident that this method is beneficial at only one pumping level because the focal length of the lens is calculated with respect to a particular pumping level. More details on the prior art are provided in an article by Osterink and Foster, "Thermal Effects and Transverse Mode Control in a Nd:YAG Lasser," Applied Physics Letters, Vol. 12, 1968, p. 128.

Contrary to the prior art, the invention does not incorporate a compensating lensing apparatus which has been ground according to the particular pumping level it will experience, but it utilizes a material whose thermal lensing characteristics with respect to temperature are opposite in sign to that of the material. These two materials in series act as an optically flat lens system at all pumping levels.

It is therefore an object of this invention to provide a laser in which the thermal lensing effect is compensated at all pumping levels.

It is another object of the invention to provide a laser in which the volume of a mode is increased thereby increasing the power output at that mode.

It is still another object of the invention to provide a method to fabricate a compensator for the thermal lensing in a laser.

A further object is to provide a laser in which an apparatus for compensating more accurately the thermal lensing effect can be incorporated in the laser.

Other objects and many of the attendant advantages of this invention will be more readily appreciated as the same becomes better understood by reference to the following detailed description and considered in connection with the accompanying drawings in which like reference symbols designate like parts throughout the FIGS. thereof and wherein.

Figure 1:
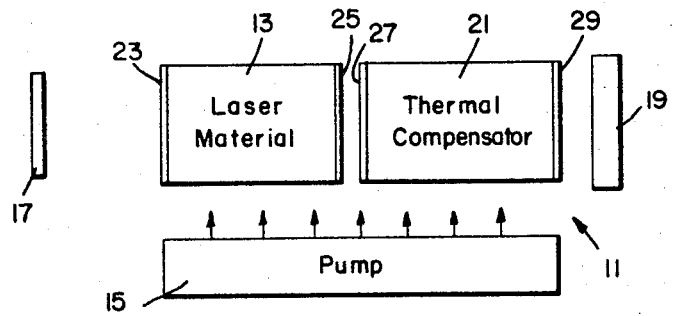
FIG. 1 is a schematic drawing of one embodiment of the invention which provides thermal compensation of lensing effect for a laser.

With reference to FIG. 1, there is shown a thermally compensated laser 11 generally comprising an active laser element 13 pumped by a conventional pumping source 15 and placed between a pair of optically reflecting surfaces 17 and 19 which form the ends of a resonant cavity. Also positioned within the resonant cavity is a thermal compensator element 21 for compensating for the thermal lensing effects of the active element 13 when it is pumped by the source 15. The end surfaces 23 and 25 of the laser element 13 and the end surfaces 27 and 29 of the thermal compensator element 21 may be coated with a conventional antireflection coating to improve the efficiency of the laser 11 and an output means such as having one or both of the reflecting surfaces 17 and 19 partially transmissive.

The active element 13 may comprise any known substance which exhibit lasing action to provide coherent light along the regenerative path provided between the reflecting surfaces making up the resonant cavity. This active material may comprise a solid, e.g. a ruby crystal or a $Nd^{++}$:YAG crystal. Also, the pumping source 15 may comprise any source of energy which is capable of exciting the molecules or ions in the active element 13 to a lasing state and need not be an optical pump source as indicated in the drawing but can be any other type of pump source suitable for exciting the particular laser material used. In other words, the pumping source 15 is a source of energy which is capable of establishing the necessary inverted population density condition in the active element 13. Examples of such pumping sources are means for providing a radio frequency field, a xenon flash tube or any other suitable type of energy source.

Experimentally, it has been found that the index of refraction changes proportionally to the change in temperature and according an equation can be written $$n = n_o + \alpha(T - T_o)$$

with $n_o$ being the index at temperature $T_o$ and $\alpha$ being the derivative of the index with respect to temperature.

The function of temperature is radius dependent because, while the laser element 13 is uniformly heated by the illumination from the pumping source 15, it can only be cooled at its surface. Thus, a first order approximation of the function of temperature may be expressed by a parabolic equation $$T(r) = (\beta - \gamma r^2)$$

with $\beta$ and $\gamma$ being constants depending on the material, environmental conditions, and illumination.

It can also be deduced from the above information that the change in the index of refraction is a radius dependent function which can be expressed as $$\Delta n(r) = \alpha(\beta - \gamma r^2 - T_o).$$

Thermal lensing occurs when the derivative of this function, $\Delta n(rr)$, is not zero. A negative derivative indicates a convex lens, while a positive derivative indicates a concave lens.

In order to obtain the desired results, the compensating element 21 may be doped with known impurities to produce an absorption spectrum similar to that of active laser element. Of course, it is assumed that both elements 13 and 21 are exposed to the same heating condition at each wavelength. If not, then a different absorption spectrum should be obtained. As the derivative of the index of refraction for the compensating element is chosen opposite in sign to that of the active laser element (although not necessarily equal in magnitude), a combination of this element having an appropriate length in series with the active laser element will negate the thermal lensing effect at all pumping levels.

The appropriate length is determined by the requirement that there must be no unequal change in the path length, $\Delta L_p$, with respect to the radius, $r$. The path length $L_p$ is given by the equation $$L_p = L_m + L_l(n_l - 1) + L_c(n_c - 1),$$

where $L_m$ is the spacing between the reflectors 17 and 19, $L_l$ is the length of the active laser element, $L_c$ is the length of compensating element, $n_l$ is the index of refraction of active laser element 13, and $n_c$ is the index of refraction of the compensating element 21. The change in path length is determined by the equation $$\Delta L = L_l \Delta n_l(r) + L_c \Delta n_c(r).$$

Since for both elements the change in index of refraction is a product of the derivative of the index and the change in temperature gradient, then the appropriate length of the compensating element is given by the equation $$L_c = -(\alpha_l/\alpha_c)L_l.$$

The derivatives of the index of refraction, $\alpha$, for various materials are listed below:

| Material | $\alpha \times 10^6$ |
| --- | --- |
| Sapphire (7065A.) | +12.6 |
| Nd:YAG (1.06$\mu$) | +4.8 |
| Polystyrene (7674A.) | −200 |
| NaCl (60° C., 1.1$\mu$) | −36.4 |
| NaF (0.546−3.5$\mu$) | −16. |

Because the overall change in path length, $\Delta L_p$, is uniform with respect to the radius, $r$, there is no lensing effect. However, a uniform change in path length creates problems in stabilizing a laser which may be solved by several stabilization schemes.

Figure 2A:
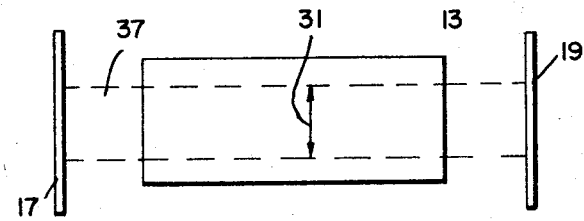
FIG. 2A is a schematic drawing of a laser in which there is no thermal lensing.
Figure 2B:
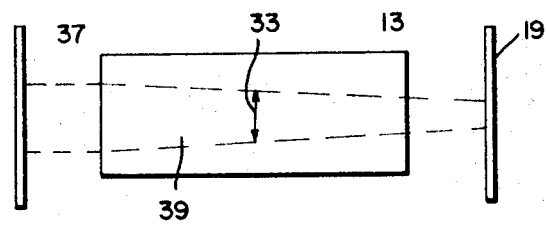
FIG. 2B is a schematic drawing of a laser in which there is thermal lensing.
Figure 2C:
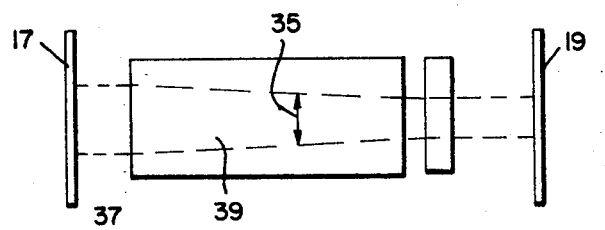
FIG. 2C is a schematic drawing of a laser in which thermal lensing has been compensated in accordance with the teachings of the invention.

The thermal lensing effect and the compensation of that effect for the laser 11 shown in FIG. 1 are diagrammed in FIGS. 1A, 2B, and 2C. FIG. 2A shows the volume 31 of a hypothetical mode as if there were no thermal lensing; FIG. 2B shows the volume 33 of the same mode as if there were thermal lensing; and in FIG. 2C the volume 35 of the same mode is shown increased over that volume shown in FIG. 2B after thermal lensing has been compensated. For FIGS. 2A, 2B and 2C, it is assumed that all other conditions are the same. Of course, it is realized that a series of tradeoffs on all these conditions would constitute engineering improvements of a laser. For example, flat reflectors 17 and 19 are shown, although often it is a better design to have spherical reflectors.

In FIG. 2B the thermal lens formed is equivalent to a thick convex lens, and a parallel laser beam 37 is caused to converge inside the laser element 13 to thus decrease the volume of the modes within the regenerative path. In FIG. 2C, the thermal lens is compensated by the compensating element 21 which acts as a thick concave lens and causes the converging laser beam 39 to diverge enough so that it is again parallel. The volume of the mode within the regenerative path is thus increase to approximately its original size.

Figure 3:
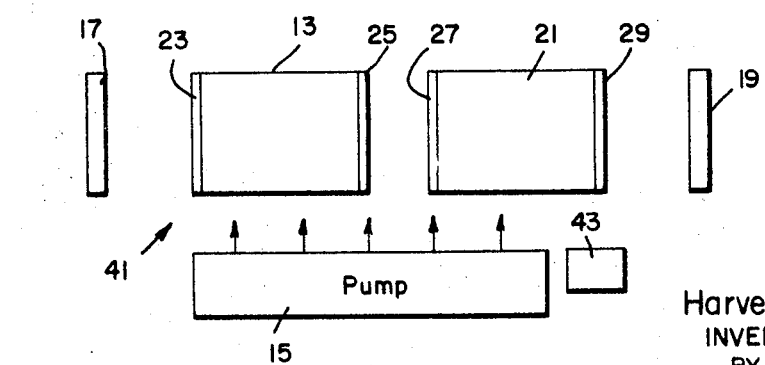
FIG. 3 is a schematic drawing of another embodiment of the invention which, in addition to compensating for the thermal lensing effect in the laser as shown in FIG. 1, provides an apparatus for fine tuning of the compensator.

A thermally compensated laser 41 shown in FIG. 3 includes the same elements as those shown in FIG. 1 with the exception that a fine tuning apparatus 43 has been added. The fine tuning apparatus consists of an additional illumination source which may be varied in intensity to maintain the function of temperature in the compensating element approximately equal to that in the active laser element.

From the foregoing, it can be seen that there has been described a laser in which compensation of the thermal lensing effect at all pumping levels is accomplished. It has also been shown that mode volume and power output of that mode is increased by compensating for the thermal lensing effect. Furthermore, a method of fabricating a thermal compensator for the thermal lensing effect has been described. Additionally, an apparatus for finely tuning the compensator has been discussed.

Although specific embodiments have been herein described, it will be appreciated that other organizations of the specific arrangement shown may be made within the spirit and scope of the invention. For example, the active laser material may be any material exhibiting laser action, and the spacing of the various elements of the thermally compensated lasers in FIGS. 1 and 2 may be other than that shown. Furthermore, it should be noted that the sketches in various FIGS. are not drawn to scale and that the distances of and between various FIGS. are not to be considered significant. As set forth previously, other components similar in function may be substituted for the components shown in the drawings.

Accordingly, it is intended that the foregoing disclosure and the showings made in the drawings shall be considered only as illustrations of the principles of this invention and are not to be construed in a limiting sense.

I claim:

1. A thermally compensated laser, comprising:
   a laser regenerative cavity including end reflectors defining a regenerative path therebetween and including means for providing a laser output beam;
   an active laser material disposed within said laser cavity in said regenerative path and having a certain lensing characteristic with respect to temperature;
   pumping means coupled to said laser material for producing pump energy to excite said laser material to a lasing state; and
   a second material disposed within said laser cavity in said regenerative path exposed to said pump energy and having a lensing characteristic with respect to temperature opposite in direction to said characteristic of said laser material.

2. A thermally compensated laser according to claim 1, wherein said second material has been doped with impurities to obtain an absorption spectrum equal to that of said active laser material.

3. A thermally compensated laser according to claim 2, wherein the length of said second material is determined by the product of the ratio $(-\alpha_l/\alpha_c)$ and the length of said active material.

4. A thermally compensated laser according to claim 1, wherein means coupled to said second material for maintaining a temperature distribution in said second material approximately equal to a temperature distribution in said active laser material are provided.

5. A thermally compensated laser according to claim 3, wherein said active laser material is $Nd^{++}$:YAG; and said second material is polystyrene.

PO-1050
(5/69)

UNITED STATES PATENT OFFICE
CERTIFICATE OF CORRECTION

Patent No. 3,577,098          Dated  May 4, 1971

Inventor(s)   Harvey V. Winston

It is certified that error appears in the above-identified patent and that said Letters Patent are hereby corrected as shown below:

Col. 1, line 16, "Lasser" should be --Laser--.
Col. 2, line 14, "according" should be --accordingly--.
       line 32, delete "$\Delta n(rr,$" and substitute therefor
               --$\Delta n(r)$., with respect to the radius, r,--.
Col. 3, line 5, "1A" should be --2A--.
       line 25, "increase" should be --increased--.

Signed and sealed this 26th day of October 1971.

(SEAL)
Attest:

EDWARD M. FLETCHER, JR.          ROBERT GOTTSCHALK
Attesting Officer                Acting Commissioner of Pa